(12) United States Patent
Perkins et al.

(10) Patent No.: US 12,275,520 B2
(45) Date of Patent: Apr. 15, 2025

(54) LIQUID-DIVERTING PANEL ASSEMBLIES

(71) Applicant: THE BOEING COMPANY, Chicago, IL (US)

(72) Inventors: Thomas Seth Perkins, Renton, WA (US); Xiaoxi Wang, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 1144 days.

(21) Appl. No.: 16/787,129

(22) Filed: Feb. 11, 2020

(65) Prior Publication Data

US 2021/0245859 A1  Aug. 12, 2021

(51) Int. Cl.
   *B64C 1/06* (2006.01)
   *F28B 9/08* (2006.01)

(52) U.S. Cl.
   CPC ............. *B64C 1/067* (2013.01); *F28B 9/08* (2013.01)

(58) Field of Classification Search
   None
   See application file for complete search history.

(56) References Cited

U.S. PATENT DOCUMENTS

| | | | |
|---|---|---|---|
| 3,631,923 A * | 1/1972 | Izeki | F28B 9/08 165/DIG. 185 |
| 3,837,396 A * | 9/1974 | Newton | F28B 9/08 165/111 |
| 5,827,598 A | 10/1998 | Larsen | |
| 5,897,079 A | 4/1999 | Specht | |
| 7,051,793 B1 * | 5/2006 | Schulz-Harder | F28D 15/046 165/104.33 |
| 7,083,147 B2 | 8/2006 | Movsesian | |
| 8,722,143 B2 | 5/2014 | Werner | |
| 9,139,739 B2 | 9/2015 | Megaridis | |
| 9,551,538 B2 * | 1/2017 | Honmura | G06F 1/203 |
| 10,421,072 B2 | 9/2019 | Megaridis | |
| 10,907,258 B1 | 2/2021 | Kota | |
| 10,988,230 B2 * | 4/2021 | Richardson | B64C 1/067 |
| 11,155,035 B2 | 10/2021 | Miller et al. | |
| 2004/0000165 A1 * | 1/2004 | Max | E03B 3/28 62/615 |

(Continued)

FOREIGN PATENT DOCUMENTS

| | | |
|---|---|---|
| CN | 103221771 | 7/2013 |
| CN | 106232696 | 12/2016 |

(Continued)

OTHER PUBLICATIONS

Qualitech LTD., "What is Photo-etching", Jul. 6, 2024, accessed Aug. 11, 2024, general definition provided therein. (Year: 2024).*

(Continued)

*Primary Examiner* — Magdalena Topolski
*Assistant Examiner* — Shanna Danielle Glover
(74) *Attorney, Agent, or Firm* — Joseph M. Butscher; The Small Patent Law Group LLC

(57) ABSTRACT

A panel assembly (such as for an internal cabin of an aircraft) includes at least one liquid flow path formed on at least one surface through surface treatment. The at least one liquid flow path is formed in relation to at least one bank on the at least one surface. The at least one liquid flow path is configured to divert liquid to a desired location.

23 Claims, 8 Drawing Sheets

(56) References Cited

U.S. PATENT DOCUMENTS

| | | |
|---|---|---|
| 2006/0068109 A1 | 3/2006 | Frankenberger et al. |
| 2007/0146998 A1* | 6/2007 | Sarno ............... B60R 11/02 361/707 |
| 2007/0231559 A1 | 10/2007 | Kim |
| 2009/0269837 A1* | 10/2009 | Shevkoplyas ....... B01D 63/088 702/19 |
| 2010/0143741 A1 | 6/2010 | Bell |
| 2010/0210745 A1* | 8/2010 | McDaniel ............. C09D 7/48 521/55 |
| 2012/0295093 A1 | 11/2012 | Belpaire |
| 2013/0168057 A1* | 7/2013 | Semenic ............. F28D 15/02 165/104.21 |
| 2014/0017457 A1 | 1/2014 | Megaridis |
| 2015/0108272 A1 | 4/2015 | Picot |
| 2016/0195072 A1 | 7/2016 | Macaraeg |
| 2017/0106965 A1* | 4/2017 | Dickson .............. B64C 1/066 |
| 2017/0113776 A1 | 4/2017 | Johnson |
| 2018/0194917 A1* | 7/2018 | Dikeman ............ B29C 65/18 |
| 2020/0165461 A1 | 5/2020 | Brockway |
| 2020/0181458 A1 | 6/2020 | Lei |
| 2021/0114266 A1 | 4/2021 | DiMaio |
| 2021/0138734 A1 | 5/2021 | Maben |
| 2021/0245859 A1 | 8/2021 | Perkins |

FOREIGN PATENT DOCUMENTS

| | | |
|---|---|---|
| CN | 108431109 | 8/2018 |
| EP | 0435650 | 7/1991 |
| EP | 2805811 | 11/2014 |
| EP | 2982599 | 2/2016 |
| EP | 3395672 | 10/2018 |
| EP | 3693270 | 8/2020 |
| KR | 20110075241 A * | 7/2011 |
| WO | WO 2009/127460 | 10/2009 |
| WO | WO 2010/123771 | 10/2010 |

OTHER PUBLICATIONS

Extended European Search Report for EP 21156387.9.
English translation of First Ntofocation of Office Action for CN202110187575.9, dated Dec. 16, 2024.
Extended European Search Report for EP24192035.4, dated Jan. 15, 2025.

* cited by examiner

LIQUID-DIVERTING PANEL ASSEMBLIES

FIELD OF EMBODIMENTS OF THE DISCLOSURE

Embodiments of the present disclosure generally relate to liquid management methods, and more particularly, to liquid-diverting panel assemblies and methods, such as may be used within an aircraft.

BACKGROUND OF THE DISCLOSURE

As an airplane is operated, condensation may occur during various phases of flight. In particular, surfaces of interiors aircraft components in spaces that are not climate controlled are frequently exposed to condensate. During aircraft design and manufacture, special consideration is given with respect to the potential of moisture within the airplane, so as to ensure that corrosion of various internal structures, short-circuiting, arcing, and/or degradation of electrical components, and the like, does not occur. In general, condensation is directly related to environmental conditions within an internal cabin of the airplane, and indirectly related to ambient conditions outside of the airplane when grounded. Passengers, crew, onboard meals, and onboard beverages may contribute to condensation within an airplane.

Water accumulation due to condensation occurs in both short and long range flights, but is generally more excessive in continuous long-range flights over six hours having quick turn-around departures. Accordingly, various systems and methods have been developed to control and manage condensation within an airplane.

Many airplanes include various moisture management devices to minimize or otherwise reduce moisture within an internal cabin. For example, drains, moisture impermeable insulation blankets, zonal air dryers (such as dehumidifiers), humidity control systems, and other such moisture management devices are used to capture and/or direct moisture away from an internal cabin interior and divert the moisture to a bilge, through which the moisture drains overboard via pressure valves.

As can be appreciated, however, the various moisture management devices add weight and cost to an airplane. Further, installing the various moisture management devices increases manufacturing time.

Also, during installation, absorbent moisture management devices may be compressively rolled or stacked in relation to other aircraft components. As the moisture management device is compressed, internal absorbing space within the moisture management device is also compressed, which may reduce the ability of the moisture management device to absorb and retain moisture. Therefore, as the moisture management device is compressed, its effectiveness may decrease.

SUMMARY OF THE DISCLOSURE

A need exists for efficient moisture management within an aircraft, for example. Further, a need exists for structures, such as panels, within vehicles that are configured to isolate an internal cabin from surrounding aircraft volumes and isolate moisture.

With those needs in mind, certain embodiments of the present disclosure provide moisture isolation and control systems and methods, such as with respect to a panel assembly including at least one liquid flow path formed on at least one surface through surface treatment. The at least one liquid flow path is formed in relation to at least one bank on the at least one surface. The at least one liquid flow path is configured to divert liquid to a desired location.

In at least one embodiment, the at least one liquid flow path has a first wettability associated with a first surface energy. The at least one bank has a second wettability associated with a second surface energy. The first wettability differs from the second wettability. The first wettability provides increased liquid flow compared to the second wettability.

As an example, the panel assembly includes a first ply, and a second ply. One or both of the first ply or the second play includes the at least one surface. For example, the at least one surface may include an outer surface of the first ply. As another example, the at least one surface may include an inner surface of the second ply. The panel assembly may also include insulation secured to the second ply.

In at least one embodiment, the at least one liquid flow path includes a flow-directing network including a plurality of interconnected flow director elements. As an example, one or more of the plurality of interconnected flow director elements includes a central stem, a first lateral branch connected to the central stem, and a second lateral branch connected to the central stem. The first lateral branch may be a mirror image of the second lateral branch.

In at least one embodiment, the first lateral branch and the second lateral branch include an upper channel that angles towards the central stem, an inwardly-curved channel connected to the upper channel, and an outwardly-curved channel connected to the inwardly-curved channel and a lower portion of the central stem.

In at least one embodiment, the flow-directing network includes a first plurality of flow director elements within a first row, and a second plurality of flow director elements within a second row. In at least one embodiment, the plurality of flow director elements within the first row have a first height, and the plurality of flow director elements within the second row have a second height that is greater than the first height.

As but one example, the flow-directing network includes at least ten rows of the flow director elements. A height of flow director elements in lower rows is greater than a height of flow director elements in upper rows.

In at least one embodiment, the flow directing network also includes at least one flow transmission orifice area on the boundary of the outer surface. The area may be located and oriented such that liquid from the flow directing network is channeled to the orifice and thus to adjacent aircraft components. The adjacent components may also include flow direction features.

As an example, the flow direction features of the adjacent component may couple to a flow directing network of the first component. The flow directing network on the adjacent component may include a greater capacity such that liquid diverted by the at least one flow transmission orifice of the first component is accommodated along with moisture deposited on the outer surface of the second component from other sources.

In at least one embodiment, at least two adjacent components with surfaces that include flow directing networks are present such that liquid flows continuously across the outer surfaces of the at least two components. The surface of the at least two components may include a moisture control network that directs moisture towards a designated aircraft bilge zone.

Certain embodiments of the present disclosure provide an aircraft including an internal cabin, and at least one component within the internal cabin. The at least one component includes a panel assembly, as described herein. For example, the at least one component comprises one or more of one or more ceiling panels, one or more stowage bin assemblies, one or more sidewall panels, one or more ceiling coves, one or more doorway arch panels, and/or one or more doorway side panels.

DETAILED DESCRIPTION OF THE DISCLOSURE

Figure 1:
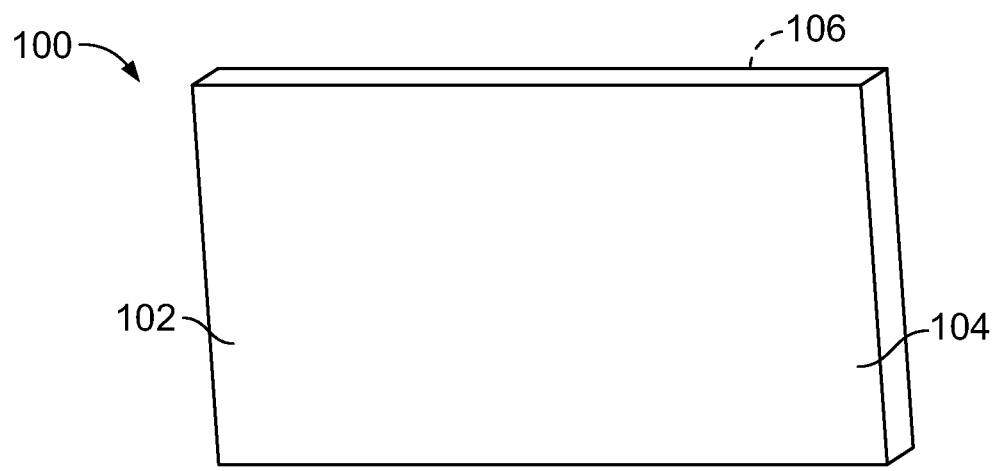
FIG. 1 illustrates a perspective front view of a structure, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide methods of forming liquid flow paths on a surface of a structure. The liquid flow paths divert liquid to designated locations, such as a drain, bilge, or the like. The structure having the liquid flow paths can be used in various settings, such as within a vehicle (such as an aircraft, automobile, train car, watercraft, or the like), a building (such as a residential or commercial property), and/or various articles of manufacture.

Certain embodiments of the present disclosure provide a method including providing a structure having an outer surface, and modifying the outer surface through surface treatment. In at least one embodiment, the modifying includes forming one or more liquid flow paths having a first wettability (or first surface flow resistance) that differs from other portions of the structure. For example, the liquid flow paths are between banks having a second wettability (or second flow resistance) that differs from the first wettability. The first wettability provides increased liquid flow in comparison to the second wettability. Accordingly, liquid flows over the liquid flow paths. In this manner, the structure is formed having liquid flow paths, such as through surface treatment. The liquid flow paths are configured to direct liquid towards a desired location, such as to a drain, bilge, or the like.

Embodiments of the present disclosure provide structures that are configured to control condensation, such as within an aircraft, vehicle, building, or the like. Further, embodiments of the present disclosure provide structures that route liquid to desired locations without increasing weight and cost (in contrast to separate and distinct moisture control devices) to a system.

Certain embodiments of the present disclosure provide a panel assembly, such as may be used within an aircraft. The panel assembly includes areas of different surface energy, which are configured to control moisture. Areas of first (or second) surface energy (associated with a first (or second) wettability) are hydrophobic and discourage moisture flow. Areas of second (or first) surface energy (associated with a second (or first) wettability) are non-hydrophobic and encourage moisture flow. In at least one embodiment, an outer surface of the panel assembly includes a liquid flow path including a flow-directing network having a plurality of interconnected flow director elements that collect and route moisture via gravitational force.

Certain embodiments of the present disclosure provide a panel assembly that includes a pattern of different surface energies over a surface. Such integral surface features route moisture from across an entire area of the surface of the panel assembly to designated drainage paths. The drainage paths may connect with other moisture routing features, or allow the moisture to freely flow into a bilge area, for example.

Certain embodiments of the present disclosure provide a panel assembly that includes an inner ply, a core, and an outer ply. The outer ply includes a surface treatment. The surface treatment includes at least one liquid flow path for diverting moisture. The outer ply may include an insulation layer for resisting sound and/or heat.

In at least one embodiment, the surface treatment includes a liquid flow path formed by branches and stems. The branches and stems are configured to channel liquid towards a union of the branches and stems. The flow direction is substantially aligned with a direction of gravitational or inertial force.

FIG. 1 illustrates a perspective front view of a structure 100, according to an embodiment of the present disclosure. In at least one embodiment, the structure 100 is a panel, sheet, or the like. In at least one other embodiment, the structure 100 is a block, sphere, pyramid, irregularly-shaped structure, or the like.

As shown, the structure 100 can be a flat sheet of material. Optionally, the structure 100 can include one or more curved surfaces.

The structure 100 includes a first face 102 having an exposed surface 104. The first face 102 is coupled to a second face 106 opposite from the first face 102. The first face 102 can be a front, rear, top, bottom, lateral, or other such face. The surface 104 is an outer surface of the structure 100.

The structure 100 is formed of a material, such as a plastic, metal, composite, and/or the like. For example, the structure 100 can be formed of a thermoplastic, such as nylon, polycarbonate (PC), polypheylsulfone (PPSU), polyetherimide (PEI), or the like. As another example, the structure 100 can be formed of epoxy, phenolic materials, and/or the like.

Figure 2:
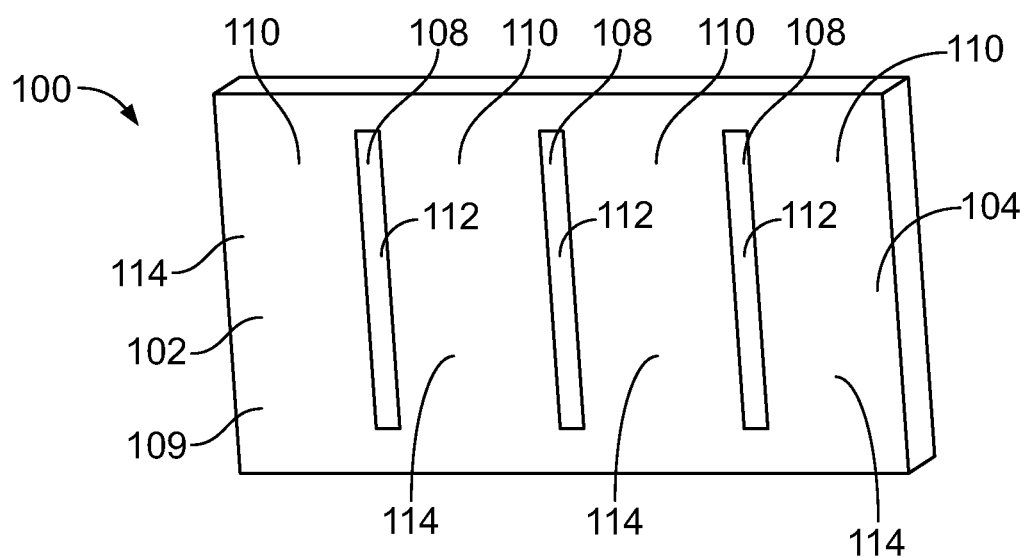
FIG. 2 illustrates a perspective front view of the structure having liquid flow paths formed through surface treatment, according to an embodiment of the present disclosure.

FIG. 2 illustrates a perspective front view of the structure 100 having liquid flow paths 108 formed through surface treatment, according to an embodiment of the present disclosure. The liquid flow paths 108 are formed on a main body 109, such as between banks 110. The liquid flow paths 108 have a first wettability 112 that differs from a second wettability 114 of the remainder of the main body 109, such as the banks 110. The first wettability 112 provides increased liquid flow rate as compared to the second wettability 114. As such, the first wettability 112 of the liquid flow paths 108 allows for liquid to flow with increased ease as compared to the banks 110. In this manner, the liquid flow paths 108 are configured to divert liquid, such as water, to a desired location, such as a bilge, drain, or the like, such as via gravity.

Liquid can flow on the banks 110. However, the banks 110 resist liquid flow greater than the liquid flow paths 108. During a flight of an aircraft, structures within an aircraft may vibrate. Due to gravity and vibration during a flight, liquid gathers and flows along the liquid flow paths 108. In at least one embodiment, boundaries between treated and untreated areas provide the banks 110.

It is to be understood that first and second in relation to wettability are merely terms used to differentiate. That is, the first wettability differs from the second wettability. The liquid flow paths 108 have increased wettability in comparison to the remainder of the main body 109 of the structure 100, such as that of the banks 110. It is to be understood that the first wettability is not necessarily one of increased wettability. For example, the liquid flow paths 108 may have a second wettability that is increased in relation to a first wettability of the banks 110.

The structure 100 can include more or less liquid flow paths 108 than shown. Further, the liquid flow paths 108 can be sized and shaped differently than shown. For example, the liquid flow paths 108 can be horizontally or diagonally oriented, instead of vertically oriented. As another example, the liquid flow paths 108 can include one or more curved portions, instead of being linear.

The wettability of a surface relates to surface tension or surface energy of a liquid, such as water. Wettability relates to surface flow resistance. As an example, increasing wettability of a surface increases a likelihood that the liquid flows over the surface, in contrast to beading up on the surface. Conversely, decreasing wettability of a surface increases a likelihood that the liquid will bead on the surface, as opposed to flowing over the surface. As another example, increasing the surface flow resistance of a surface decreases a likelihood that liquid flows over the surface, in contrast to beading up on the surface. Conversely, decreasing the surface flow resistance of a surface decreases a likelihood that the liquid will bead on the surface, as opposed to flow over the surface. For example, a bank 110 has a higher surface flow resistance than a liquid flow path 108.

Figure 3:
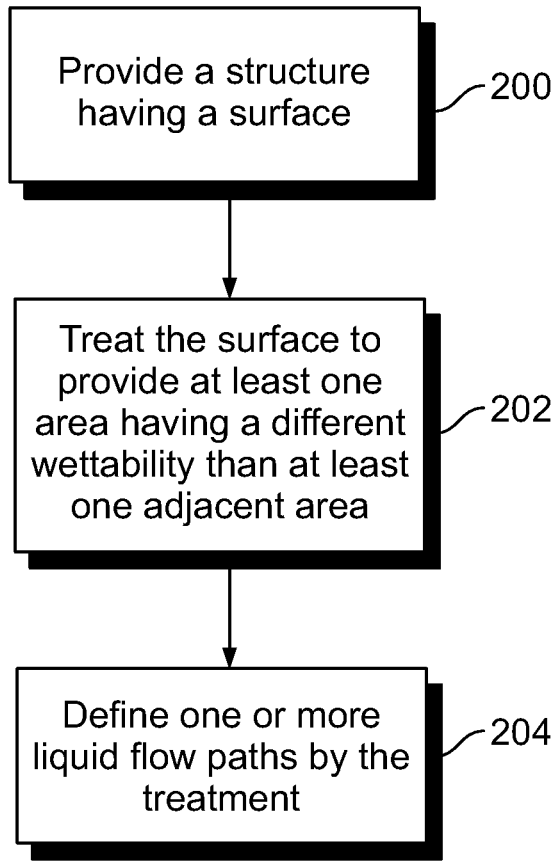
FIG. 3 illustrates a flow chart of a method of forming one or more liquid flow paths on a surface of a structure, according to an embodiment of the present disclosure.

FIG. 3 illustrates a flow chart of a method of forming one or more liquid flow paths on a surface of a structure, according to an embodiment of the present disclosure. Referring to FIG. 103, at 200, the structure 100 having the surface 104 is provided. At 202, the surface 104 is treated to provide at least one area having a different wettability than at least one area that is adjacent to the at least one area. The at least one area provides at least one liquid flow path 108, while the at least one area that is adjacent to the at least one area can be or include one or more banks 110. Accordingly, at 204, the one or more liquid flow paths 108 are defined by the treatment of the surface 104.

The surface treatment of 202 can be performed through a variety of surface treatment processes. For example, the structure 100 can be formed of a thermoplastic or thermoset, such as an epoxy or phenolic material. The treatment can be via an in-mold texturing, printing, bonding or cutting, chemical etching, painting using a blocking layer, and/or the like. As another example, the structure 100 can be nylon, PC, PPSU, PEI, or the like, and the treatment can be via superficial foaming, bonding, texturing, chemical etching, or the like. The treatment modifies at least a portion of the surface 104 to define one or more liquid flow paths 108 having a different wettability than a remainder of the main body 109, such as the banks 110.

Treating a portion of the surface 104 of the structure 100 to form one or more liquid flow paths 108 can include texturing the portion to modify a wettability of the portion. As another example, treating the portion can include printing on the portion, such through three-dimensional printing, ink printing, laser printing, and/or the like, to modify a wettability of the portion. As another example, the treating can include chemically etching the portion to modify a wettability of the portion. As another example, the treating can include superficial foaming the portion to modify a wettability of the portion. In at least one embodiment, the treating can include one or more of texturing the portion to modify a wettability of the portion, printing on the portion, chemically etching the portion to modify a wettability of the portion, and/or superficial foaming the portion to modify a wettability of the portion.

In at least one embodiment, the treatment of the surface 104 is via superficial foaming. For example, in the case of a thermoplastic surface, a physical foaming agent (such as high pressure carbon dioxide gas or supercritical carbon dioxide) can be applied to the localized area on surface 104, such as at areas that are to be the liquid flow paths 108. In the saturation process, the physical foaming agent can be allowed to remain on the surface 104 for a predetermined period of time to diffuse into the area for a certain depth, such as ten minutes (optionally, the time period can be more or less than ten minutes, such as twenty minutes, or five minutes). The physical foaming agent is then removed, and the structure 100 can then be heated leading to superficial foaming, which thereby modifies the areas to a certain depth. In this manner, superficial foaming modifies a wettability of areas of the structure. Further, during the saturation process, an area to be treated may be sealed locally to maintain a high pressure gas state or supercritical state for the physical foaming agent.

Figure 4:
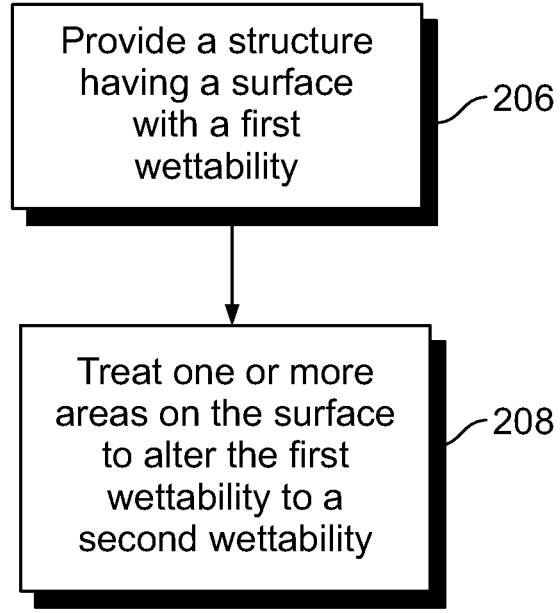
FIG. 4 illustrates a flow chart of a method of forming one or more liquid flow paths on a surface of a structure, according to an embodiment of the present disclosure.

FIG. 4 illustrates a flow chart of a method of forming one or more liquid flow paths on a surface of a structure, according to an embodiment of the present disclosure. Referring to FIGS. 1, 2, and 4, at 206, the structure 100 having the surface 104 with a first wettability is provided. As an example, the first wettability can be one in which water beads on the surface. As such, the first wettability can be a relatively low wettability in that water beads thereon, instead of flowing over the surface 104. Next, at 208, one or more areas are treated on the surface to alter the first wettability to a second wettability. The treatment can include superficial foaming, chemical etching, painting, printing, or the like. In at least one embodiment, the one or more areas are desired locations for the liquid flow paths 108. As such, the second wettability is greater than the first wettability. That is, the second wettability allows for increased liquid flow, and decreased liquid beading.

As another example, the first wettability can be one in which water tends to flow over, as opposed to bead. As such, the first wettability can be a relatively high wettability. In this embodiment, areas on the surface 104 are treated to alter the first wettability to a second wettability that is less than the first wettability. As such, the areas that are formed through surface treatment can be those that are desired to be the banks 110. The liquid flow paths 108 are formed between the banks 110.

As described herein, embodiments of the present disclosure provide a method of forming one or more liquid flow paths on a surface of a structure. The method includes providing the structure, and treating at least a portion of the surface of the structure to alter or otherwise modify a wettability thereof. The treating defines the liquid flow paths. A first wettability of the portion of the surface differs from a second wettability of a remainder of the surface. In at least one embodiment, the first wettability allows for increased flow of liquid in comparison to the second wettability. In at least one other embodiment, the first wettability allows for decreased flow of liquid as compared to the second wettability.

In at least one embodiment, the treating increases the wettability, thereby providing the liquid flow paths at the locations of treatment (for example, at the portion(s) where treated). In at least one other embodiment, the treating decreases the wettability, thereby providing the liquid flow paths at locations other than the locations of the treatment (for example, at areas other than portion(s) where treated).

Figure 5:
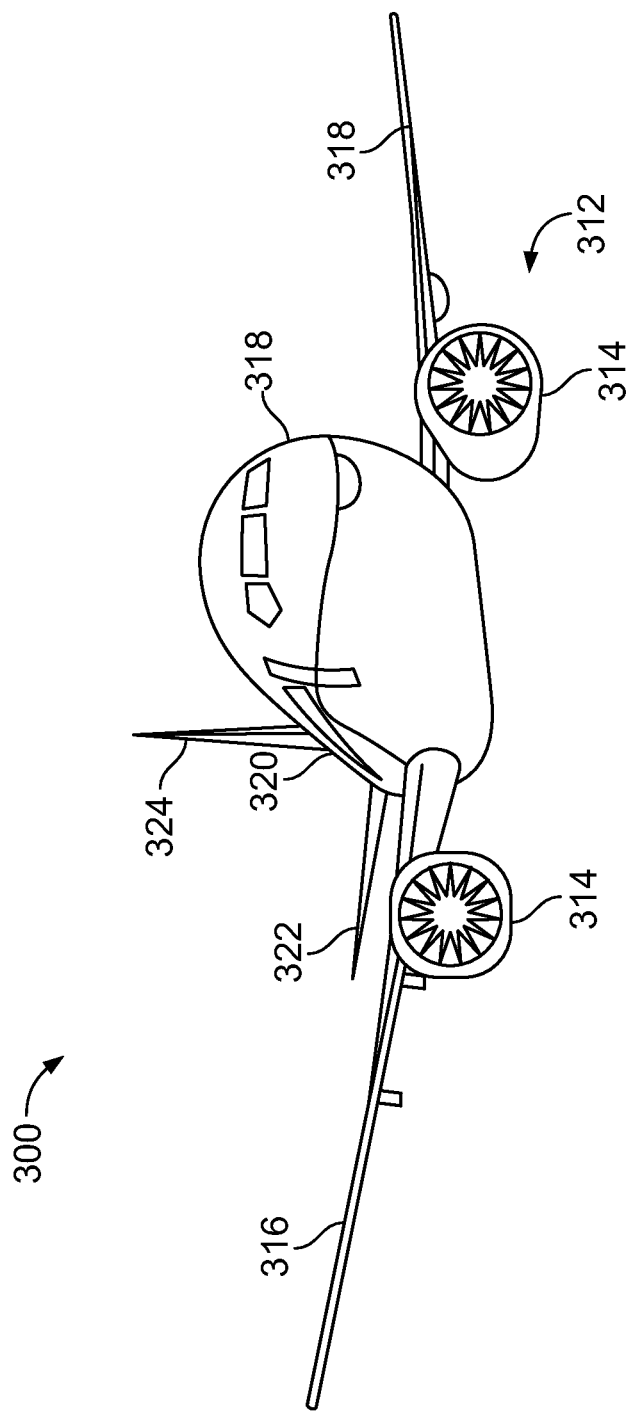
FIG. 5 illustrates a perspective front view of an aircraft, according to an embodiment of the present disclosure.

FIG. 5 illustrates a perspective front view of an aircraft 300, according to an embodiment of the present disclosure. The aircraft 300 includes a propulsion system 312 that may include two turbofan engines 314, for example. Optionally, the propulsion system 312 may include more engines 314 than shown. The engines 314 are carried by wings 316 of the aircraft 300. In other embodiments, the engines 314 may be carried by a fuselage 318 and/or an empennage 320. The empennage 320 may also support horizontal stabilizers 322 and a vertical stabilizer 324.

The fuselage 318 of the aircraft 300 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and coach sections), and an aft section. Portions of the aircraft 300, such as panels within the internal cabin, can be formed by methods to form liquid flow paths, as described herein.

Optionally, instead of an aircraft, embodiments of the present disclosure may be used with various other vehicles, such as automobiles, buses, locomotives and train cars, watercraft, spacecraft, and the like. As another example, embodiments of the present disclosure can be used to form structures having liquid flow paths for structures within buildings, articles of manufacture, or the like.

Figure 6:
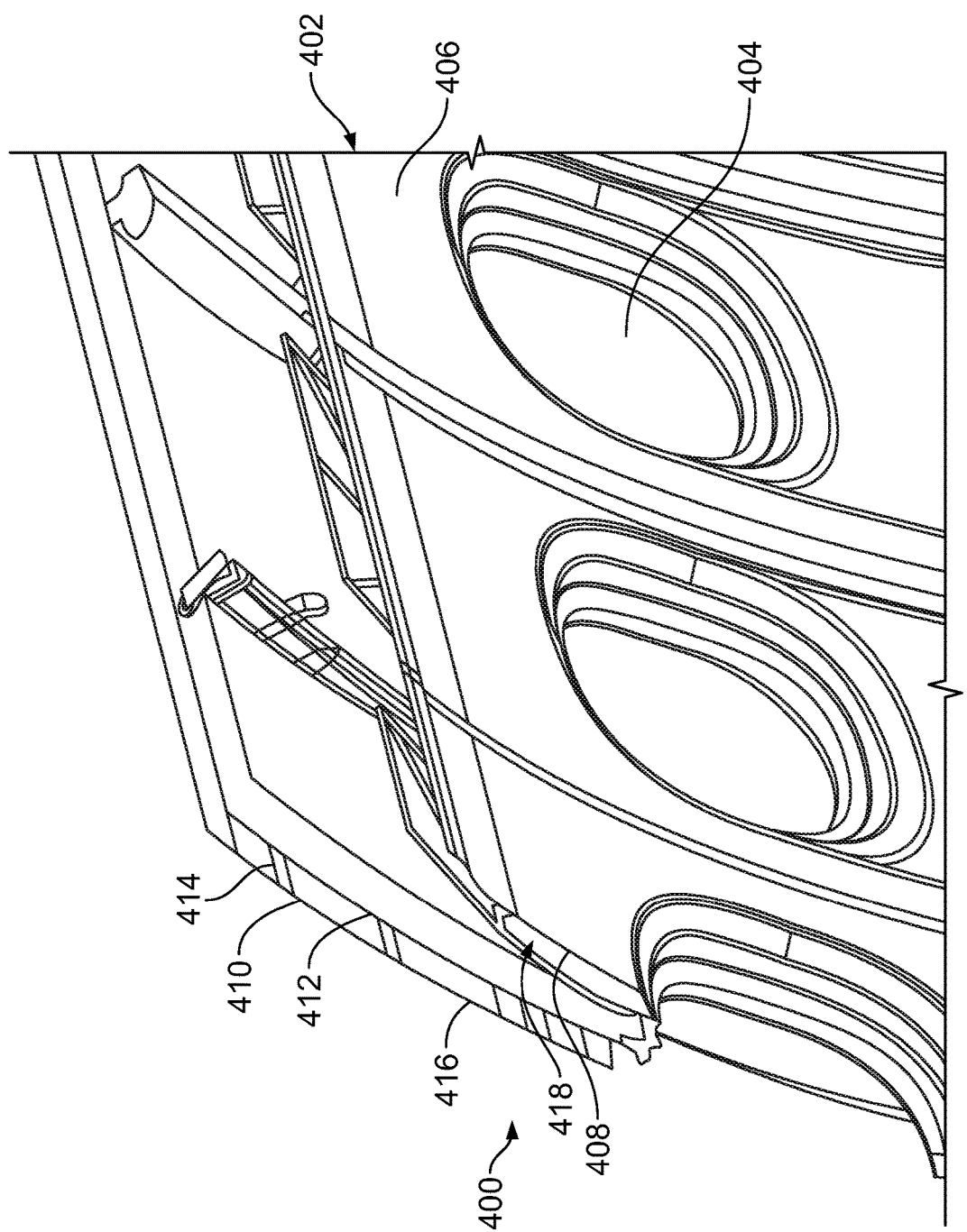
FIG. 6 illustrates a perspective view of a panel assembly that forms a portion of wall within an internal cabin of an aircraft, according to an embodiment of the present disclosure.

FIG. 6 illustrates a perspective view of a panel assembly 400 that forms a portion of wall 402 within an internal cabin of an aircraft, according to an embodiment of the present disclosure. The panel assembly 400 includes a plurality of window openings 404. Optionally, the panel assembly 400 may not include window openings.

The panel assembly 400 includes a first or inner ply 406, which faces the internal cabin. An outer surface 408 of the inner ply 406 facing away from the internal cabin may include a lining. For example, the lining may be secured to the outer surface 408.

The panel assembly 400 also includes a second or outer ply 410. In at least one embodiment, insulation 412 is secured to an inner surface 414 of the outer ply 410 facing toward the internal cabin. Optionally, the panel assembly 400 may not include the insulation 412. An outer surface 416 of the outer ply 410 is opposite from the inner surface 414.

An air gap 418 may be formed between the inner ply 406 and the outer ply 410. The air gap 418 separates the inner ply 406 from the outer ply 410. Optionally, the panel assembly 400 may not include the air gap. Instead, the inner ply 406 may be directly coupled to the outer ply 410.

In at least one embodiment, one or more surfaces of the panel assembly 400 include liquid flow paths, as described herein. For example, the outer surface 408 of the inner ply 406 may include liquid flow paths, as described herein. As another example, the inner surface 414 of the outer ply 410 may include liquid flow paths. In at least one embodiment, both the outer surface 408 of the inner ply 406 and the inner surface 414 of the outer ply 410 may include liquid flow paths. In at least one embodiment, inner and outer surfaces of the inner ply 406 and inner and outer surfaces of the outer ply 410 may include liquid flow paths.

As shown in FIG. 6, a wall of an internal cabin of an aircraft may include one or more panel assemblies 400. Optionally, various other portions of the aircraft may be formed by one or more panel assemblies 400. For example, interior monuments, such as lavatories, closets, cabinets, section dividers, and the like may include one or more panel assemblies 400. As another example, portions of stowage bin assemblies may include one or more panel assemblies 400. The panel assemblies 400 may be sized and shaped as desired.

Figure 7:
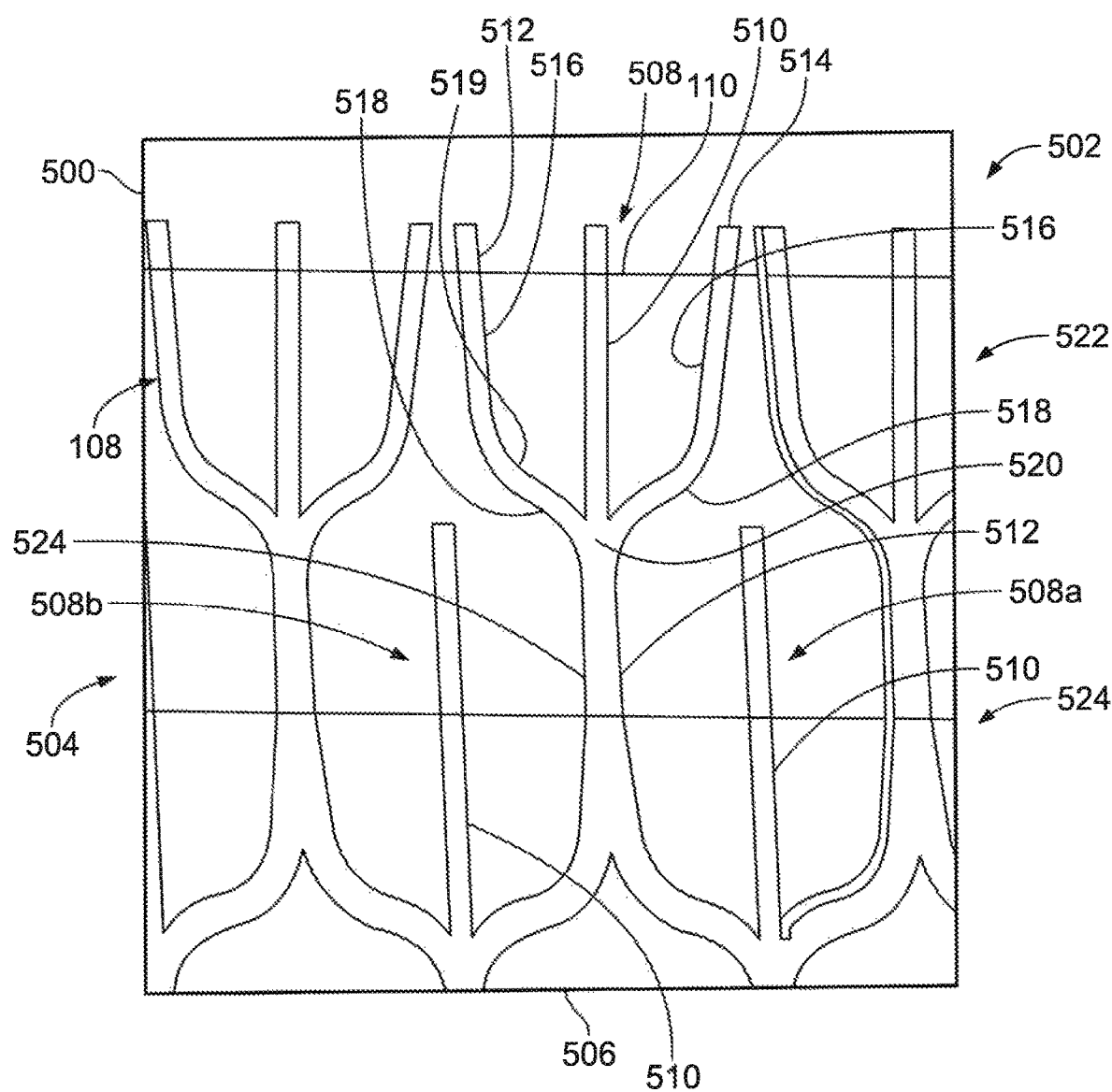
FIG. 7 illustrates a front view of a surface of a panel assembly, according to an embodiment of the present disclosure.

FIG. 7 illustrates a front view of a surface 500 of a panel assembly 502, according to an embodiment of the present disclosure. The panel assembly 400 shown in FIG. 6 is an example of the panel assembly 502. The surface 500 has been treated to provide a liquid flow path 108, as described herein. The surface 500 may be an outer and/or inner surface of an outer ply (such as the outer ply 410 shown in FIG. 6), an outer and/or inner surface of an inner ply (such as the inner ply 406 shown in FIG. 6), and/or the like.

The liquid flow path 108 includes a flow-directing network 504 that is configured to divert liquid to a desired location, such as toward a bottom 506 of the panel assembly 502, via gravity or inertial force. The flow-directing network 504 includes a plurality of interconnected flow director elements 508 formed between banks 110. The banks 110 provide barriers surrounding the flow-directing network 504. The flow-director elements 508 have a first wettability that is configured to allow for fluid flow, while the banks 110 have a second wettability that resists fluid flow. The first wettability is associated with a first surface energy. The second wettability is associated with a second surface energy, which is lower than the first surface energy (conversely, the first surface energy is higher than the second surface energy). The first surface energy provides a smooth surface that allows for fluid flow. The second surface energy provides a rough surface (that is, rougher than the smooth surface provided by the first surface energy) that resists fluid flow. As such, liquid tends to bead on the banks 110. The liquid beads on the banks 110 moves to the liquid flow paths 108, via gravity, where the liquid then freely flows downwardly, via gravity, towards a desired location, such as towards the bottom 506.

In at least one embodiment, one or more of the flow director elements 508 includes a central stem 510 connected to a first lateral branch 512 and a second lateral branch 514. The central stem 510 provides a longitudinal channel that extends towards the bottom 506. The central stem 510 may be a linear channel, formed as described herein. The first lateral branch 512 may be a mirror image of the second lateral branch 514. The first lateral branch 512 and the second lateral branch 514 include an upper channel 516 that downwardly angles towards the central stem 510. The upper channels 516 connect to an inwardly-curved channel 518 (which inwardly curve towards the central stem 510). The inwardly-curved channel 518 connects to an outwardly-curved channel 519 that connects to a lower portion of the central stem 510, thereby providing a union 520 between the central stem 510, the first lateral branch 512, and the second lateral branch 514.

The flow director elements 508 may be sized and shaped differently than shown. In at least one embodiment, the flow director elements 508 include more or less branches. For example, the flow director elements 508 may include two lateral branches on either side of the central stem 510. As another example, the flow director elements 508 may not include the central stem. As another example, the branches 512 and 514 may not be symmetrical about the central stem 510.

As shown in FIG. 7, the flow-directing network 504 includes a first row 522 of flow director elements 508 above a second row 524 of flow director elements 508. The second row 524 may be above a third row of flow director elements, and so on. In at least one embodiment, the flow-directing network 504 may include only a single row of flow director elements 508. In at least one embodiment, instead of a flow-director network 504, the panel assembly 502 may include a single flow director element 508.

As shown in FIG. 7, the union 520 of a flow director element 508 within the first row 522 connects to (for example, is in fluid communication with) a first lateral branch 512 of a first flow director element 508a of the second row 524 and a second lateral branch 514 of a second flow director element 508b of the second row 524. As shown, the first lateral branch 512 of the first flow director element 508a is integrally formed and connected with the second lateral branch 514 of the second flow director element 508b. In this manner, flow director elements 508 within the first row 522 may interconnect and cascade with flow director elements 508 of the second row 524 (which may similarly interconnect and cascade with flow director elements 508 of a third row, and so on).

The flow director elements 508 within the first row 522 may be sized and shaped the same as the flow director elements 508 within the second row 524. Optionally, the flow director elements 508 within the first row 522 may be sized and shaped differently than the flow director elements 508 within the second row 524. For example, the central stems 510 and/or the first and second lateral branches 512 and 514 of the flow director elements 508 within the second row 524 may be larger (for example, have increased height and/or area) than those within first row 522, or vice versa. The flow director elements 508 within each row may be sized and shaped the same or differently.

The flow director elements 508 provide a pattern formed by surface treatment, as described herein, that is configured to divert liquid toward a desired location, such as the bottom 506 of the panel assembly 502. The sizes and shapes of the flow director elements 508 may vary depending on setting, application, part geometry, part orientation, and/or the like.

In operation, moisture that condenses on the rougher areas, defined by the banks 110, forms beads. The external flow of liquid on the banks 110 flows in an uncontrolled manner until it intersects a portion of a flow director element 508, which provides a relatively smooth area that promotes controlled flow of liquid. As liquid contacts a portion of the flow director element 508, the liquid flows in a controlled manner within the flow director element 508, via gravity, due to the relatively high surface energy of the flow director element 508. Adhesion of the liquid to the higher surface energy of the flow director element 508 prevents, minimizes, or otherwise reduces the potential of the liquid flowing onto the banks 110. The panel assembly 502 facilitates liquid flow by destabilizing droplet shapes on the roughened areas of the banks 110, allowing inertial forces to dominate surface tension, and promote flow into and through the liquid flow path 108, defined by the one or more flow director elements 508.

Figure 8:
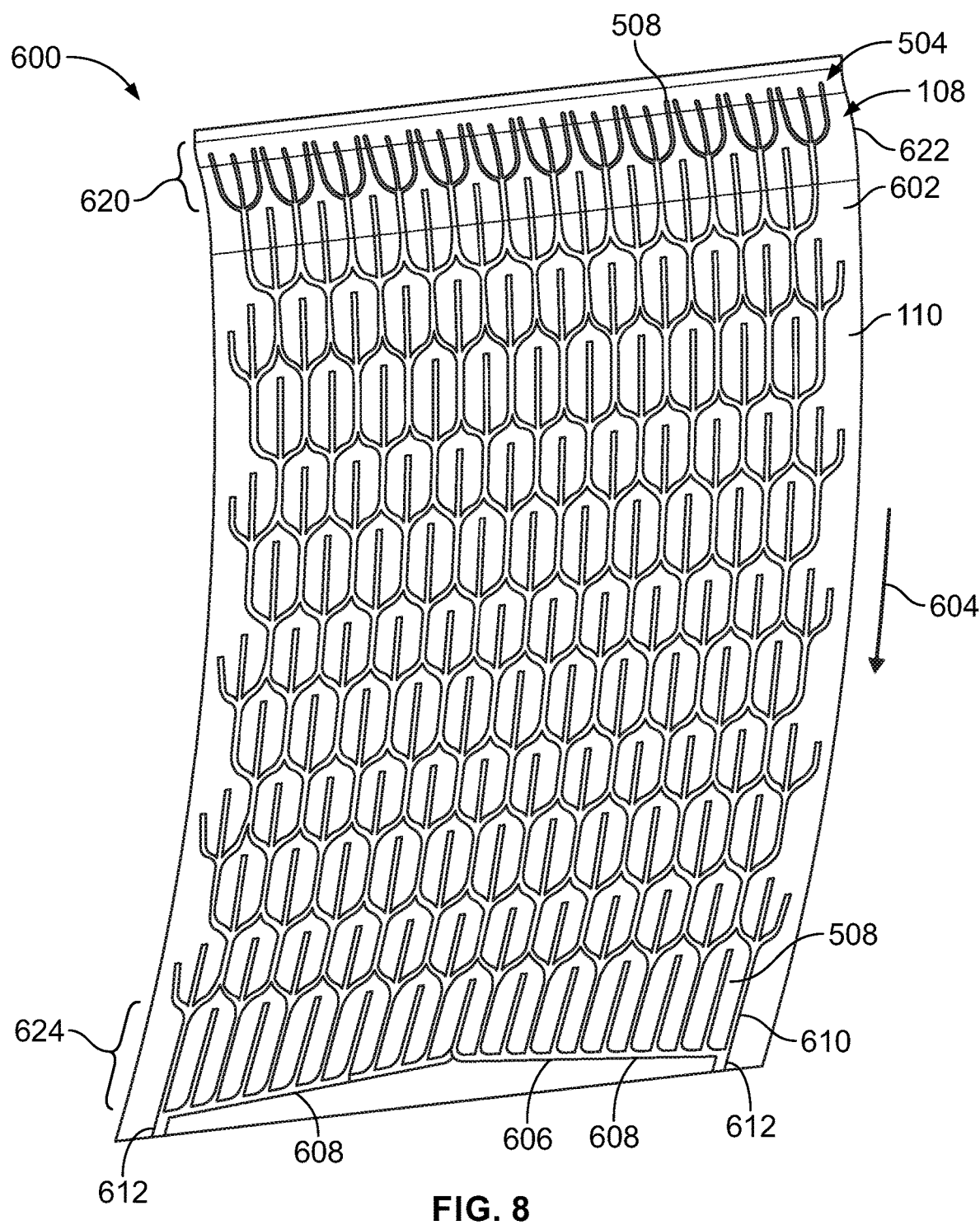
FIG. 8 illustrates a perspective front view of a panel assembly, according to an embodiment of the present disclosure.

FIG. 8 illustrates a perspective front view of a panel assembly 600, according to an embodiment of the present disclosure. The panel assembly 400 shown in FIG. 6 and the panel assembly 502 shown in FIG. 5 are examples of and/or provide portions of the panel assembly 600 shown in FIG. 8, or vice versa. As shown, the panel assembly 600 includes a liquid flow path 108 formed on a surface 602 thereof. The liquid flow path 108 includes a flow-directing network 504 of interconnected and cascading flow director elements 508. For example, the flow-directing network 504 includes ten or more rows of interconnected flow director elements 508. Optionally, the flow-directing network 504 may include less than ten rows of interconnected flow director elements 508.

Liquid on the surface 602 beads on the banks 110 and moves, via gravity or inertial force, into the flow director elements 508. The liquid flows downwardly in the direction of arrow A towards a lower drain channel 606 of the flow-directing network 504. The lower drain channel 606 is formed in the same manner as the liquid flow directors 508. That is, the lower drain channel 606 has a wettability that promotes liquid flow, in contrast to the banks 110.

Lower drain channel 606 may include downwardly angled segments 608 that connect to the lowest row 610 of flow director elements 508. The segments 608 may, in turn, connect to drain outlets 612.

As shown, the height or area of the flow director elements 508 within higher rows may be less than the height or area of the flow director elements 508 within lower rows. That is, a height of flow director elements in lower rows is greater than a height of flow director elements in upper rows. The height of flow director elements may progressively increase as rows descend. For example, the height 620 of the flow director elements 508 within the highest row 622 may be less than the height 624 of the flow director elements 508 within the lowest row 610. The increasing height progression from upper to lower rows accommodates and promotes increased flow rates.

As shown, the flow-directing network 504 is circuitous and tortuous, with numerous interconnected and cascading flow director elements 508. The multiple potential paths for liquid flow defined by the numerous interconnected flow director elements 508 accommodate an increased volume of flow. That is, flow volume increases with the number of flow director elements 508. Further, as shown, the interconnected flow director elements 508 define multiple directions for liquid flow, which ensures flow of liquid towards the bottom in the direction of arrow 604, even during orientational changes (such as when an aircraft changes altitude or attitude). Moreover, the various directional changes defined by the numerous flow direction elements 508 within the flow-directing network 504 limit flow inertial velocity, which reduces a potential of a surge flow and/or liquid overflowing the banks 110.

The panel assembly 600 may be formed of a composite thermoplastic or thermoset, for example. The pattern of flow director elements 508 within the flow-directing network 504 may be formed by surface treatment, as described herein. For example, the flow director elements 508 may be formed by texture pattern on a forming die, chemical etching on a metallic surface, and/or the like.

Figure 9:
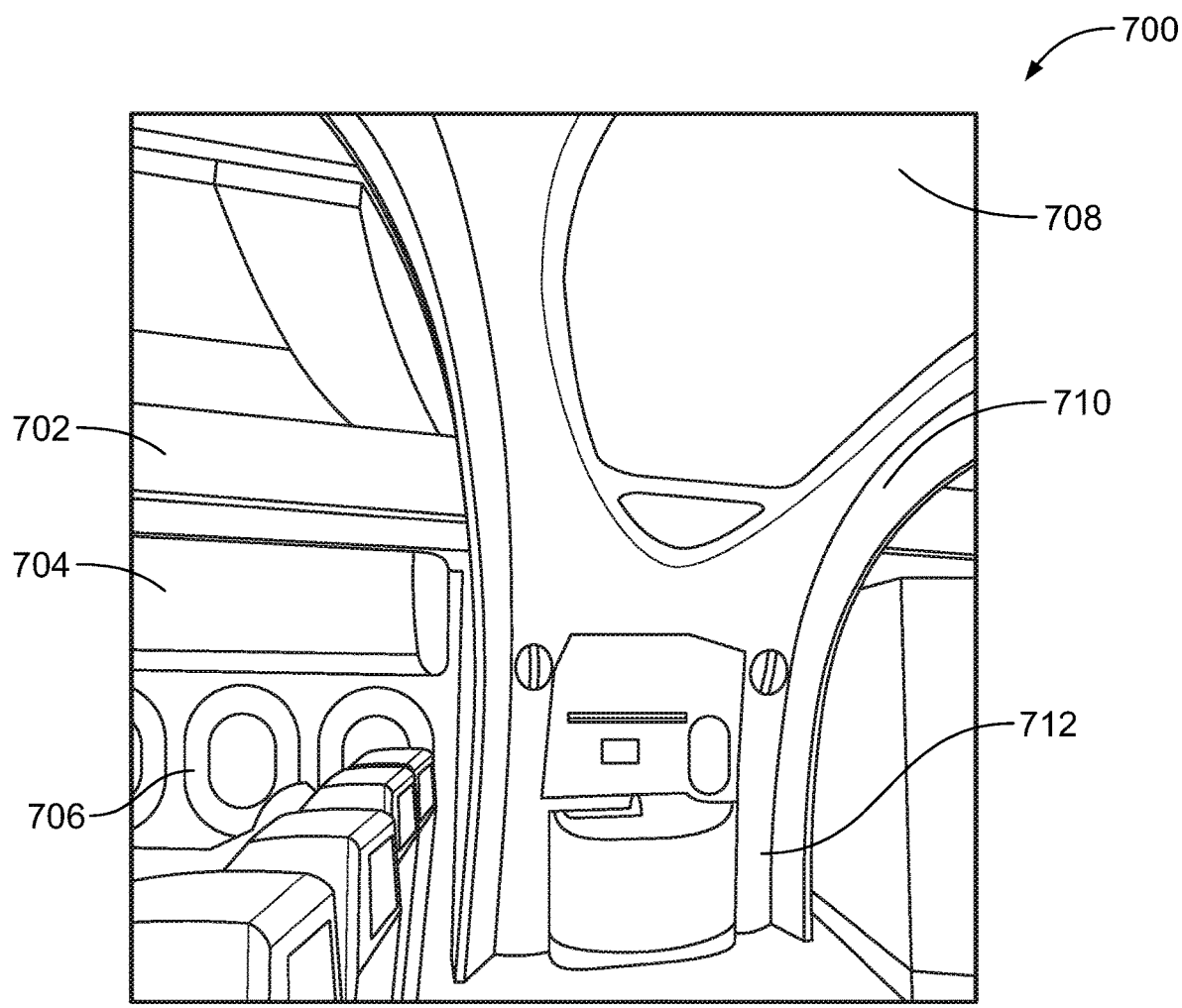
FIG. 9 illustrates a perspective internal view of an internal cabin of a vehicle, according to an embodiment of the present disclosure.

FIG. 9 illustrates a perspective internal view of an internal cabin 700 of a vehicle, (such as the aircraft 300 shown in FIG. 5) according to an embodiment of the present disclosure. The internal cabin 700 includes numerous components that may be formed from and/or otherwise include panel assemblies, such as the panel assembly 400 (shown in FIG. 6), the panel assembly 502 (shown in FIG. 7), and the panel assembly 600 (shown in FIG. 8). For example, ceiling panels 702, stowage bin assemblies 704, sidewall panels 706, ceiling coves 708, doorway arch panels 710, doorway side panels 712, partitions, closets, lavatory walls, light valences, and/or the like may include panel assemblies, as described herein.

Figure 10:
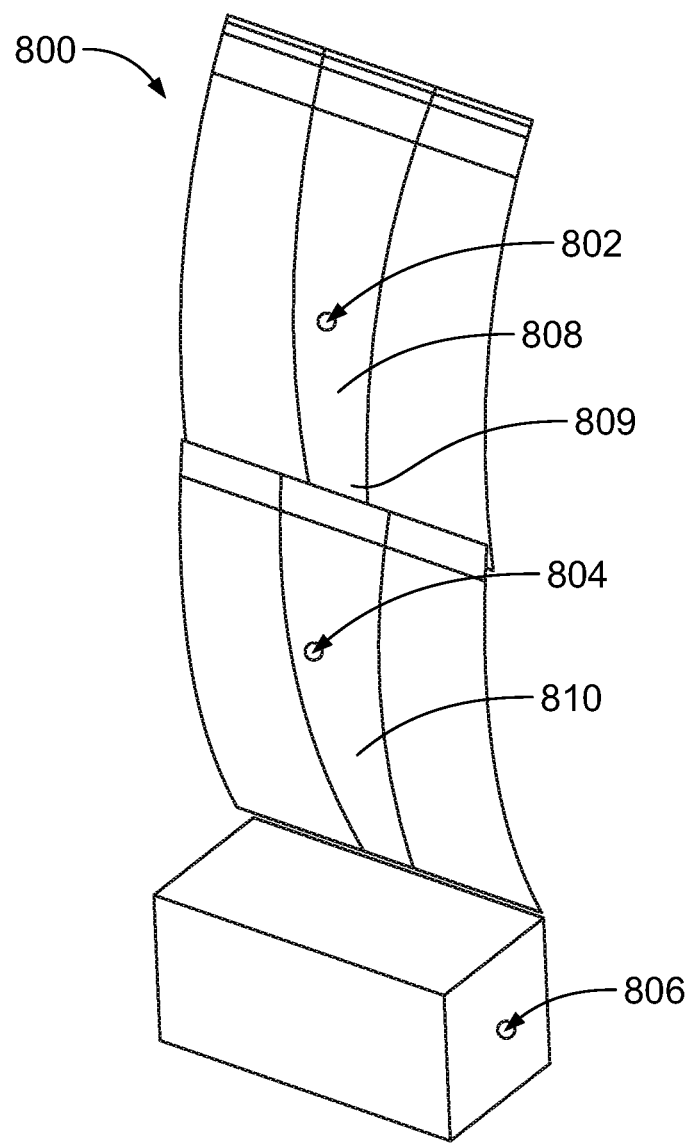
FIG. 10 illustrates a liquid flow system, according to an embodiment of the present disclosure.

FIG. 10 illustrates a liquid flow system 800, according to an embodiment of the present disclosure. The liquid flow system 800 includes a first panel assembly 802 coupled to a second panel assembly 804, which, in turn, is coupled to a bilge 806, such as a bilge within an aircraft. The panel assemblies 802 and 804 are connected in series, with the first panel assembly 802 secured above the second panel assembly 804. The first panel assembly 802 includes a flow channel 808 (for example, a liquid flow path) that leads into a flow channel 810 (for example, a liquid flow path) of the second panel assembly 804. The flow channel 810 leads into the bilge 806. The flow channels 808 and 810 are formed through surface treatment, as described herein. The flow channels 808 and 810 may be sized and shaped differently than shown. Further, the liquid flow system 800 may include more or less panel assemblies than shown.

The liquid flow system 800, such as a flow directing network, may include includes at least one flow transmission orifice 809 on the boundary of the outer surface of the first panel assembly 802. The area may be located and oriented such that liquid from the flow directing network is channeled to the orifice 809 and thus to adjacent aircraft components, such as to the second panel assembly 804. The adjacent components may also include flow direction features.

As an example, the flow direction features of the adjacent component (for example, the second panel assembly 804) may couple to a flow directing network of the first component (for example, the first panel assembly 802). The flow directing network on the adjacent component may include a greater capacity such that liquid diverted by the at least one flow transmission orifice of the first component is accommodated along with moisture deposited on the outer surface of the second component from other sources.

In at least one embodiment, at least two adjacent components with surfaces that include flow directing networks are present such that liquid flows continuously across the outer surfaces of the at least two components. The surface of the at least two components may include a moisture control network that directs moisture towards a designated aircraft bilge zone, such as the bilge 806.

As described herein, embodiments of the present disclosure provide panel assemblies and methods of forming panel assemblies that are configured to efficiently manage moisture, such as within an aircraft, for example. The structures include liquid flow paths that are formed through surface treatment. Embodiments of the present disclosure provide lightweight and cost-effective structures that are integrally formed with liquid flow paths. As such, weight for a system can be reduced as there is a reduced need for separate and distinct moisture management devices. Instead, the structures that form portions of a system, such as an aircraft, are integrally formed with their own liquid flow paths that divert moisture to desired locations.

Certain embodiments of the present disclosure provide a structure, such as a panel, sheet, or the like. The structure has a surface, such as an exposed outer surface. A portion of the surface is treated to modify a wettability of the portion of the structure. At least one liquid flow path is formed on the surface through the treated portion.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A panel assembly, comprising:
   at least one liquid flow path formed on at least one surface through surface treatment,
   wherein the surface treatment includes a superficial foamed portion on the at least one surface,
   wherein the at least one liquid flow path is formed in relation to at least one bank on the at least one surface, and
   wherein the at least one liquid flow path is configured to divert liquid to a desired location.

2. The panel assembly of claim 1, wherein the at least one liquid flow path has a first wettability associated with a first surface energy, wherein the at least one bank has a second wettability associated with a second surface energy, wherein the first wettability differs from the second wettability, and wherein the first wettability provides increased liquid flow compared to the second wettability.

3. The panel assembly of claim 1, further comprising:
   a first ply; and
   a second ply,
   wherein one or both of the first ply or the second ply comprises the at least one surface.

4. The panel assembly of claim 3, wherein the at least one surface comprises an outer surface of the first ply.

5. The panel assembly of claim 3, wherein the at least one surface comprises an inner surface of the second ply.

6. The panel assembly of claim 3, further comprising insulation secured to the second ply.

7. The panel assembly of claim 1, wherein the at least one liquid flow path comprises a flow-directing network including a plurality of interconnected flow director elements.

8. The panel assembly of claim 7, wherein one or more of the plurality of interconnected flow director elements comprises:
   a central stem;
   a first lateral branch connected to the central stem; and
   a second lateral branch connected to the central stem.

9. The panel assembly of claim 8, wherein the first lateral branch is a mirror image of the second lateral branch.

10. The panel assembly of claim 8, wherein the first lateral branch and the second lateral branch comprise:
    an upper channel that angles towards the central stem;
    an inwardly-curved channel connected to the upper channel; and
    an outwardly-curved channel connected to the inwardly-curved channel and a lower portion of the central stem.

11. The panel assembly of claim 7, wherein the flow-directing network comprises:
    a first plurality of flow director elements within a first row; and
    a second plurality of flow director elements within a second row.

12. The panel assembly of claim 11, wherein the plurality of flow director elements within the first row have a first height, and wherein the plurality of flow director elements within the second row have a second height that is greater than the first height.

13. The panel assembly of claim 7, wherein the flow-directing network comprises at least ten rows of the flow director elements, wherein a height of flow director elements in lower rows is greater than a height of flow director elements in upper rows.

14. An aircraft comprising:
    an internal cabin; and
    at least one component within the internal cabin, wherein the at least one component comprises a panel assembly, wherein the panel assembly comprises:
    at least one liquid flow path formed on at least one surface through surface treatment,
       wherein the surface treatment includes a superficial foamed portion on the at least one surface,
       wherein the at least one liquid flow path is formed in relation to at least one bank on the at least one surface, and
       wherein the at least one liquid flow path is configured to divert liquid to a desired location.

15. The aircraft of claim 14, wherein the at least one component comprises one or more of:
    one or more ceiling panels;
    one or more stowage bin assemblies;
    one or more sidewall panels;
    one or more ceiling coves;
    one or more doorway arch panels; or
    one or more doorway side panels.

16. The aircraft of claim 14, wherein the at least one liquid flow path has a first wettability associated with a first surface energy, wherein the at least one bank has a second wettability associated with a second surface energy, wherein the first wettability differs from the second wettability, and wherein the first wettability provides increased liquid flow compared to the second wettability.

17. The aircraft of claim 14, wherein the panel assembly comprises:
    a first ply;
    a second ply; and
    insulation secured to the second ply,
    wherein one or both of the first ply or the second ply comprises the at least one surface.

18. The aircraft of claim 14, wherein the at least one liquid flow path comprises a flow-directing network including a plurality of interconnected flow director elements, wherein one or more of the plurality of interconnected flow director elements comprises:
    a central stem;
    a first lateral branch connected to the central stem; and
    a second lateral branch connected to the central stem.

19. The aircraft of claim 18, wherein the first lateral branch and the second lateral branch comprise:
    an upper channel that angles towards the central stem;
    an inwardly-curved channel connected to the upper channel;
    an outwardly-curved channel that connected to the inwardly-curved channel and a lower portion of the central stem.

20. The aircraft of claim 18, wherein the flow-directing network comprises a plurality of rows of the flow director elements, wherein a height of flow director elements in lower rows is greater than a height of flow director elements in upper rows.

21. The panel assembly of claim 1, wherein the superficial foamed portion is formed through application of a physical foaming agent to a localized area on the portion, wherein the physical foaming agent is allowed to remain on the portion of the at least one surface for a predetermined period of time to diffuse into the portion of the at least one surface, wherein the physical foaming agent is removed from the portion of the at least one surface after being allowed to remain on the portion of the at least one surface, and wherein the at least one surface is heated after the physical foaming agent is removed from the portion of the at least one surface.

22. A panel assembly, comprising:
- a first ply;
- a second ply, wherein one or both of the first ply or the second ply comprises at least one surface;
- insulation secured to the second ply; and
- at least one liquid flow path formed on the at least one surface through surface treatment,
- wherein the surface treatment includes one or more of a printed portion on the at least one surface, a chemically etched portion on the at least one surface, or a superficial foamed portion on the at least one surface,
- wherein the at least one liquid flow path has a first wettability associated with a first surface energy, wherein the at least one bank has a second wettability associated with a second surface energy, wherein the first wettability differs from the second wettability, and wherein the first wettability provides increased liquid flow compared to the second wettability,
- wherein the at least one liquid flow path is formed in relation to at least one bank on the at least one surface,
- wherein the at least one liquid flow path is configured to divert liquid to a desired location,
- wherein the at least one liquid flow path comprises a flow-directing network including a plurality of interconnected flow director elements,
- wherein one or more of the plurality of interconnected flow director elements comprises:
- a central stem;
- a first lateral branch connected to the central stem; and
- a second lateral branch connected to the central stem, wherein the first lateral branch is a mirror image of the second lateral branch, wherein the first lateral branch and the second lateral branch comprise:
  - an upper channel that angles towards the central stem;
  - an inwardly-curved channel connected to the upper channel; and
  - an outwardly-curved channel connected to the inwardly-curved channel and a lower portion of the central stem.

23. The panel assembly of claim 22, wherein the flow-directing network comprises:
- a first plurality of flow director elements within a first row, wherein the plurality of flow director elements within the first row have a first height; and
- a second plurality of flow director elements within a second row, wherein the plurality of flow director elements within the second row have a second height that is greater than the first height.

* * * * *